United States Patent
Hoff et al.

(10) Patent No.: US 10,543,443 B2
(45) Date of Patent: Jan. 28, 2020

(54) AIR INTAKE SYSTEM FOR ENGINES

(71) Applicant: Caterpillar Inc., Peoria, IL (US)

(72) Inventors: Brian D. Hoff, Washington, IL (US); Kraig M. Love, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 20 days.

(21) Appl. No.: 15/840,316

(22) Filed: Dec. 13, 2017

(65) Prior Publication Data

US 2019/0176075 A1  Jun. 13, 2019

(51) Int. Cl.
| | | |
|---|---|---|
| *F02M 35/10* | (2006.01) | |
| *B01D 46/00* | (2006.01) | |
| *B08B 5/04* | (2006.01) | |
| *F02M 35/024* | (2006.01) | |
| *F02M 35/08* | (2006.01) | |
| *F02M 35/09* | (2006.01) | |

(52) U.S. Cl.
CPC ............ *B01D 46/0068* (2013.01); *B08B 5/04* (2013.01); *F02M 35/024* (2013.01); *F02M 35/086* (2013.01); *F02M 35/09* (2013.01); *B01D 46/0086* (2013.01); *B01D 2279/60* (2013.01); *F02M 35/10* (2013.01)

(58) Field of Classification Search
CPC .... F02M 35/086; F02M 35/024; F02M 35/10; F02M 35/09; B01S 46/0068; F01D 46/0086; B01D 2279/60; F08B 5/04
USPC ........................................ 123/184.21–184.61
See application file for complete search history.

(56) References Cited

U.S. PATENT DOCUMENTS

| | | | | |
|---|---|---|---|---|
| 3,877,454 | A | * | 4/1975 | Axmann ................ F02M 35/04 123/198 E |
| 5,030,259 | A | * | 7/1991 | Bryant ................. B01D 50/002 15/340.1 |
| 5,205,261 | A | | 4/1993 | Betts, Jr. et al. |
| 5,401,285 | A | * | 3/1995 | Gillingham ........ B01D 46/0005 55/284 |
| 5,683,479 | A | | 11/1997 | Gillingham et al. |
| 7,878,171 | B2 | | 2/2011 | Vandike et al. |
| 9,273,648 | B2 | * | 3/2016 | Link ................... B01D 46/0068 |
| 9,273,649 | B2 | * | 3/2016 | Gomez ................. F02M 35/09 |
| 2009/0113856 | A1 | * | 5/2009 | Cooper ................... E01H 1/053 55/283 |
| 2012/0036843 | A1 | * | 2/2012 | Schertz .................. F01N 3/208 60/301 |
| 2015/0176545 | A1 | * | 6/2015 | Troxell ................ F02M 35/086 55/302 |

* cited by examiner

Primary Examiner — Long T Tran
Assistant Examiner — James J Kim
(74) Attorney, Agent, or Firm — Oblon, McClelland, Maier & Neustadt

(57) ABSTRACT

A method for operating an air intake system for an engine is disclosed. The air intake system includes an air filter configured to provide filtered air to the engine for combustion. The method includes activating a blower, by a controller, to generate suction and draw purged contaminants from the air filter for facilitating a purging of the air filter. The method further includes deactivating the blower, by the controller, upon a determination of a completion of the purging of the air filter.

17 Claims, 1 Drawing Sheet

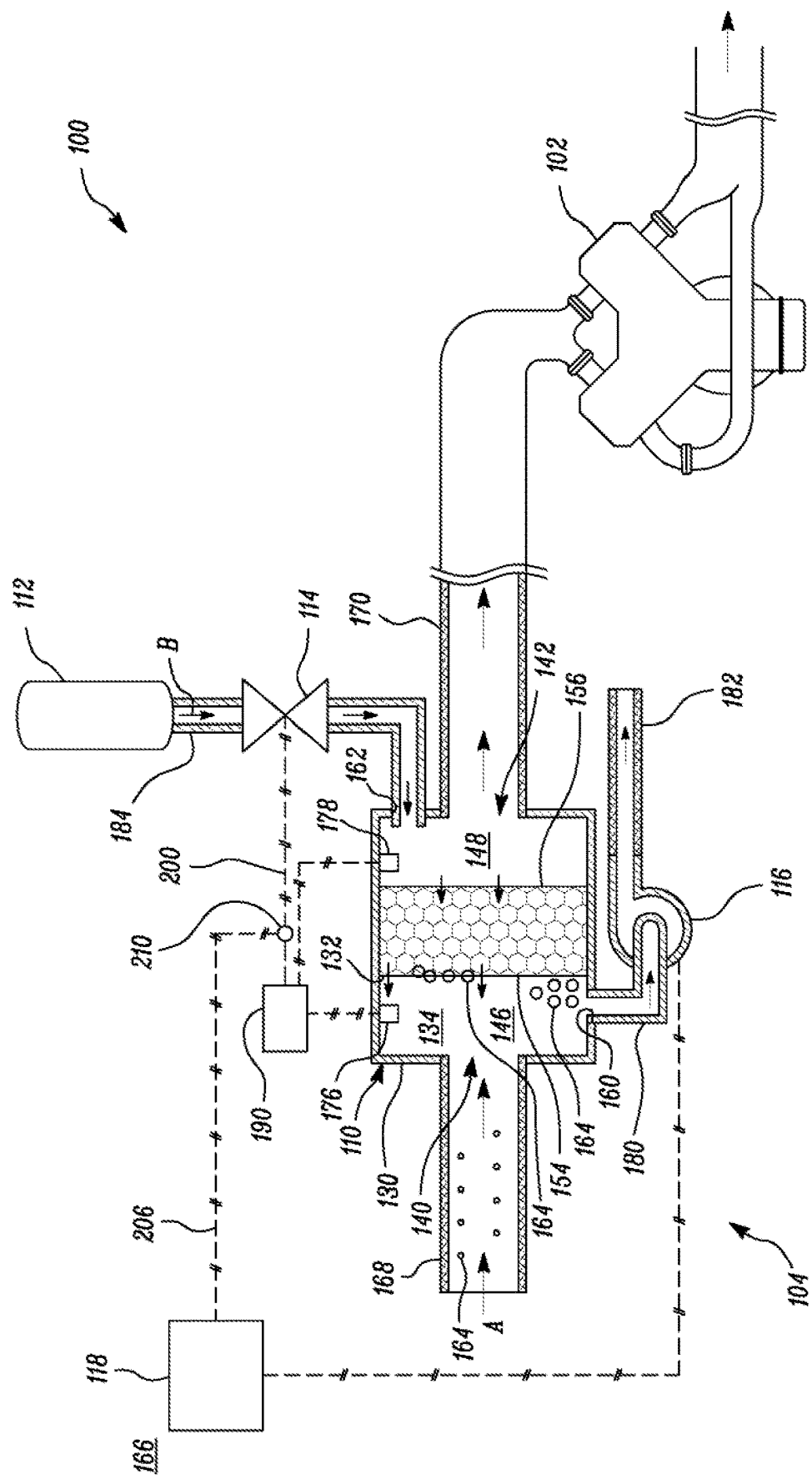

AIR INTAKE SYSTEM FOR ENGINES

TECHNICAL FIELD

The present disclosure generally relates to an air intake system for an engine, and, more particularly, relates to a method for operating the air intake system for controlling a blower for purging an air filter.

BACKGROUND

Internal combustion engines of engine systems are generally supplied with air for combustion. Typically, a supply of air includes dust and debris. To prevent possible contamination and damage to internal engine components by the ingestion of dust and debris, filters are generally provided to filter the air supplied for combustion. Over a period, such filters may become clogged with the dust and debris, and may need to be purged. A typical purging operation may include passing air against a direction of an incoming air flow to dislodge the debris from the filter, and then move the debris to the environment. Typically, a blower is used to facilitate a flow of the purged debris along with the air from the air filter to the environment by generating suction. The blower generally obtains power from an engine of the engine system, and such power is largely unregulated, incurring additional cost.

U.S. Pat. No. 9,273,648 relates to an air intake system for a work vehicle. The air intake system includes a filter assembly having a pre-cleaner and an air filter. The filter assembly defines at least one outlet port. The air intake system may also include an air valve movable between an opened position and a closed position and a blower coupled to the outlet port via a conduit. The blower may be configured to create a vacuum within the conduit such that particulates are removed from the filter assembly through the outlet port. When the air valve is in the opened position, an airflow may be directed through the filter assembly in an intake direction from the pre-cleaner through the air filter and, when the air valve is in the closed position, the airflow may be directed through the air filter in a reverse direction.

SUMMARY OF THE INVENTION

In one aspect, the disclosure is directed towards a method for operating an air intake system for an engine. The air intake system includes an air filter that is configured to provide filtered air to the engine for combustion. The method includes activating a blower, by a controller, to generate suction and draw purged contaminants from the air filter for facilitating a purging of the air filter. The method also includes deactivating the blower, by the controller, upon determining a completion of the purging of the air filter.

In another aspect, the disclosure relates to an air intake system for an engine. The air intake system includes an air filter, an air reservoir, a control valve, and a controller. The air filter is configured to provide filtered air to the engine for combustion. The air reservoir stores air at a pressure and is configured to provide air to the air filter for facilitating a purging of the air filter of contaminants. The control valve is configured to control flow of air from the air reservoir to the air filter, while the blower is fluidly coupled to the air filter. The controller is configured to activate the blower to generate suction and draw purged contaminants from the air filter for facilitating a purging of the air filter, and deactivate the blower upon determination of a completion of the purging of the air filter.

In yet another aspect, the disclosure is directed to an engine system. The engine system includes an engine, an air intake system fluidly coupled to the engine to supply air to the engine for combustion. The air intake system includes an air filter, and air reservoir, a controller valve, and a controller. The air filter filters the air supplied to the engine. The air reservoir stores air at a pressure and is configured to provide air to the air filter for facilitating a purging of the air filter of contaminants. The control valve is configured to control a flow of air from the air reservoir to the air filter. The blower is fluidly coupled to the air filter and is configured to generate suction and draw purged contaminants from the air filter for facilitating a purging of the air filter. The controller is configured to determine an initiation of the purging of the air filter, activate the blower when the initiation of the purging of the air filter is determined, and deactivate the blower upon determination of a completion of the purging of the air filter.

BRIEF DESCRIPTION OF THE DRAWINGS

FIG. 1 is a schematic view of an engine system including an engine and an air intake system for the engine, in accordance with an embodiment of the present disclosure.

DETAILED DESCRIPTION

Referring to FIG. 1, an engine system 100 is shown. The engine system 100 includes an engine 102 and an air intake system 104 for the engine 102. The engine system 100 may be used for production of motive power in machines applied in construction, mining, forestry, agriculture, locomotives, military, and similar such environments. The engine system 100 may also be applied in generator sets, such as in electric power standby applications, commonly found in commercial and domestic establishments. An applicability of the aspects of the present disclosure may also extend to various other power consumption units.

The engine 102 may be an internal combustion engine of a reciprocating type, and may be configured to receive air-fuel mixture into one or more combustion chambers (not shown) within the engine 102 for combustion and subsequent power generation. The engine 102 may be functionally implemented as one of a diesel engine, a gasoline engine, a natural gas engine, a dual fuel engine, and/or may correspond to any engine type available in the art. It may be noted that a V-configuration of the engine 102, as is provided in FIG. 1, is purely exemplary, and various other engine configurations may be contemplated. In an embodiment, the engine 102 may be a turbine engine.

The air intake system 104 is fluidly coupled to the engine 102, and is configured to supply air to the engine 102 for combustion. The air intake system 104 includes an air filter 110, an air reservoir 112, a control valve 114, a blower 116, and a controller 118. The air intake system 104 may also include additional auxiliary components, such as electrical communication lines that facilitate transmission of data between various sensing of the engine system 100 and the controller 118, and a number of fluid lines and conduits that facilitate a fluid flow from one part of the air intake system 104 to the other.

The air filter 110 may be configured to filter the air supplied to the engine 102, thus providing filtered air to the engine 102 for combustion. The air filter 110 may include an enclosure 130, and a filter element 132 of a suitable filter material housed within a chamber 134 defined by the enclosure 130. The enclosure 130 may include an inlet port 140 and an outlet port 142, and the filter element 132 may be positioned between the inlet port 140 and the outlet port 142. In further detail, the filter element 132 may divide the chamber 134 of the enclosure 130 into a first chamber portion 146 and a second chamber portion 148. The first chamber portion 146 may be in fluid communication with the inlet port 140 to receive air from the inlet port 140, while the second chamber portion 148 may be in fluid communication with the outlet port 142 to release air filtered by the filter element 132 through the outlet port 142 for combustion. Further, the filter element 132 may include a first surface 154 and a second surface 156. The first surface 154 may be directed towards the first chamber portion 146 and the second surface 156 may be directed towards the second chamber portion 148. Moreover, the first chamber portion 146 includes a first opening 160 that is in fluid communication with the first surface 154 of the filter element 132, and the second chamber portion 148 defines a second opening 162 that is in fluid communication with the second surface 156 of the filter element 132. It may be noted that the first surface 154 of the filter element 132 may be exposed to the receipt of contaminants 164 carried by an incoming air flow through the inlet port 140, and such contaminants 164 may become clogged at various locations of the first surface 154 of the filter element 132, over a period of engine operation.

Further, the air intake system 104 may include an inlet conduit 168 that may receive air for combustion from an ambient 166, and which may be coupled to the inlet port 140 of the enclosure 130. The air intake system 104 may also include an outlet conduit 170 that may deliver air filtered by the air filter 110 to the engine 102, and which may be coupled between the outlet port 142 and the engine 102.

In an embodiment, the air filter 110 may have a first sensor 176 and a second sensor 178. The first sensor 176 may be housed within the first chamber portion 146, while the second sensor 178 may be housed within the second chamber portion 148. The first sensor 176 may measure a first pressure of air inside the first chamber portion 146, while the second sensor 178 may measure a second pressure of air inside the second chamber portion 148, during engine operation.

The blower 116 may be fluidly coupled to the air filter 110, and, more particularly, to the first chamber portion 146 of the air filter 110. For example, the blower 116 may be fluidly coupled to first opening 160 defined in the first chamber portion 146 via a first fluid line 180. The blower 116 is configured to generate suction and draw in air from the first chamber portion 146. The blower 116 may also include an exit fluid line 182 that facilitates a release of the air (received from the first chamber portion 146) from the blower 116.

The air reservoir 112 may be configured to store air at a pressure (i.e. compressed air) and may be configured to provide the compressed air to the second chamber portion 148 of the air filter 110 for facilitating a purging of the air filter 110 (i.e. of the filter element 132 of the air filter 110) of contaminants 164. More particularly, the air reservoir 112 may be fluidly coupled to the second opening 162, and thus to the second chamber portion 148 of the air filter 110, via a second fluid line 184. A purging of the air filter 110 according to the present disclosure is defined as removing debris or contaminants 164 from the filter element 132.

Although an air reservoir 112 is disclosed, it is possible that some implementations may utilize an air source different from the air reservoir 112. For example, an air compressor (not shown) or an air accumulator (not shown) may be in fluid communication with the second chamber portion 148 of the air filter 110 via the second opening 162, and which may be adapted to provide air at a pressure to the second chamber portion 148 (and thus the second surface 156) of the filter element 132 to facilitate purging of the filter element 132.

The control valve 114 is configured to control a flow of air from the air reservoir 112 to the air filter 110. The control valve 114 may be coupled to the second fluid line 184 extending between the air reservoir 112 and the second opening 162 of the second chamber portion 148 of the air filter 110, and may be able to regulate a flow of air delivered from the air reservoir 112 to the air filter 110 for purging the air filter 110 (i.e. the filter element 132) of contaminants 164. The control valve 114 may be a unidirectional valve that may be opened to allow a flow of air from the air reservoir 112 to the air filter 110 (see direction. B), for purging the air filter 110, and closed to stop said transmission and purging of the air filter 110. The control valve 114 may be an electrically controlled valve, for example, including a solenoid mechanism that may be responsive to a voltage signal, and based on which the control valve 114 may be opened and/or closed.

The air intake system 104 may include an auxiliary controller 190. The auxiliary controller 190 may control a supply of voltage signals to the control valve 114 for an opening and a closing of the control valve 114. The voltage signals may be transmitted through a communication line 200 of the air intake system 104, as shown. As an example, when the control valve 114 needs to be opened, the auxiliary controller 190 may supply a voltage signal that is above a first threshold value to the control valve 114. In response to the voltage signal that is above the first threshold value, the control valve 114 may be opened to allow compressed air to flow from the air reservoir 112 to the air filter 110. Conversely, when the control valve 114 needs to be closed, the auxiliary controller 190 may halt a voltage signal transfer altogether or may reduce the voltage signal to below a second threshold value. In response to the voltage signal that is below the second threshold value, the control valve 114 may be closed to block a flow of compressed air from the air reservoir 112 to the air filter 110.

In one example, the supply of voltage signals to open the control valve 114 may be based on a determination that a clogging of the air filter 110 (i.e. the filter element 132) is above a first clogging threshold value. For example, the auxiliary controller 190 may determine a clogging of the air filter 110 by measuring a pressure differential across the air filter 110. To measure the pressure differential, the auxiliary controller 190 may seek data from the sensors 176, 178 that may respectively detect a pressure of air sustained in the first chamber portion 146 and in the second chamber portion 148 of the filter element 132, during engine operation. If a pressure difference between the first surface 154 and the second surface 156 were to exceed a pressure differential threshold (i.e. a first differential threshold), it may be determined that a clogging of the air filter 110 may too have exceeded the first clogging threshold value, and that a purging of the air filter 110 may be required. Accordingly, a voltage signal above the first threshold value may be supplied to the control valve 114 to open the control valve 114. Similarly, if a pressure differential were to fall below a pressure differential threshold (i.e. a second differential threshold), it may be determined that a clogging of the air filter 110 may too have fallen below a second clogging threshold value, and that a purging of the air filter 110 may be unrequired and/or may be stopped. Accordingly, either a voltage signal below the second threshold value may be supplied to the control valve 114 to close the control valve 114, or alternatively, a voltage transmission to the control valve 114 may be altogether stopped to close the control valve 114.

Additionally, or optionally, the supply of voltage signals to open and close the control valve 114 may be based on a predetermined operational pattern or a predetermined state of the engine 102. As an example of the predetermined operational pattern, a purging of the air filter 110 may be performed in regular intervals, and accordingly, the control valve 114 may be supplied with voltage signals for opening and closing, during those regular intervals. For example, purging may be performed in hourly cycles, daily cycles, weekly cycles, etc. As an example of a predetermined state of the engine 102, purging may be performed when an engine speed may fall below a speed threshold. For example, purging may be performed during a low engine speed state or an engine idle state, and accordingly, the control valve 114 may be supplied with voltage signals for opening and closing during such a predetermined state.

The controller 118 may be coupled to the blower 116 and to the communication line 200 extending between the auxiliary controller 190 and the control valve 114. The controller 118 is configured to detect the voltage signals receivable by the control valve 114, and determine an initiation of the purging of the air filter 110 when a voltage signal receivable by the control valve 114 is detected above a first threshold value. The controller 118 is also configured to determine the completion of the purging of the air filter 110 when a voltage signal receivable by the control valve 114 falls below a second threshold value, for a predefined time duration, t1. In one example, the controller 118 may include a communication line 206 that may be spliced to the communication line 200 extending between the auxiliary controller 190 and the control valve 114. In that manner, a supply of voltage, passed from the auxiliary controller 190 to the control valve 114, may be gathered by the controller 118 to determine the initiating and/or completion of a purging of the air filter 110.

In one example, the air intake system 104 may include a sensor 210, such as a voltage sensor, arranged on the communication line 200, and which may detect the voltage signal passing through the communication line 200. The controller 118 may be coupled to the sensor 210 via the communication line 206 to receive data pertaining to the voltage signal to determine the initiation and/or completion of a purging of the air filter 110.

Based on the determination of the initiation of the purging of the air filter 110, the controller 118 is further configured to activate the blower 116 to generate the suction and draw the purged contaminants 164 from the air filter 110 (i.e. from the first chamber portion 146 of the air filter 110) for facilitating a purging of the air filter 110. Based on the determination of a completion of the purging of the air filter 110 (i.e. when the voltage signal receivable by the control valve 114 falls below a second threshold value, for a predefined time duration, t1), the controller 118 is further configured to deactivate the blower 116. In an embodiment, the controller 118 may deactivate the blower 116 only after a predetermined time, t2, has lapsed from the determination of a completion of the purging of the air filter 110. During the predetermined time, t2, the controller 118 may look for the possibility of a start of next cycle of purging of the air filter 110, and so that the controller 118 may keep the blower 116 active across one or more cycles of purging of the air filter 110.

In an embodiment, each cycle of purging of the air filter 110 may include one or more purging events. More particularly, the controller 118 may detect the voltage signal falling below a second threshold value subsequent to the detection of voltage signal exceeding the first threshold value, and co-relate said sequential detection to a single voltage pulse, and thus to a single purging event of the air filter 110. The controller 118 may detect multiple such purging events in succession to the single purging event, each within regular time intervals, and such multiple purging events may correspond to one purging cycle of the air filter 110. In an embodiment, the controller 118 may keep the blower 116 active for an entire purging cycle, and may be configured to deactivate the blower 116 at/upon the determination of the completion of the purging cycle, after the predefined time duration, t1. A continuous run of the blower 116 across the entire purging cycle may facilitate an effective removal of the purged contaminants 164 from the air filter 110, since the blower 116 need not repeatedly spool up from a minimum speed to the maximum speed for every successive purging event of the purging cycle. When the controller 118 determines an initiation of a next cycle of purging of the air filter 110, the controller 118 may then activate the blower 116 again, and may keep the blower 116 active till the last purging event of the next purging cycle has ended and the associated predefined time duration, t1, has lapsed.

In one embodiment, the auxiliary controller 190 may be omitted, and functions of the auxiliary controller 190 may be performed by the controller 118. Accordingly, it is possible for the controller 118 to determine a clogging of the air filter 110 when the pressure difference between the first surface 154 and the second surface 156 exceeds the first differential threshold, and thus the controller 118 may also determine the completion of the purging of the air filter 110 when the clogging of the air filter 110 is below the second clogging threshold value. Moreover, the controller 118 may also determine a clogging of the air filter 110, and activate the blower 116 when the clogging of the air filter 110 is above the first clogging threshold value.

INDUSTRIAL APPLICABILITY

During operation, air for combustion from the ambient 166 may be drawn into the engine 102 for combustion. This air may first pass into the inlet conduit 168, enter the air filter 110 through the inlet port 140, and impinge on the first surface 154 of the filter element 132. As air may be further pulled into the engine 102, air passes through the filter element 132 and is filtered of the contaminants 164. Filtered air is then further passed down to the one or more combustion chambers within the engine 102. During the passage of air through the filter element 132, the first surface 154 of the filter element 132 traps the contaminants 164 therein. Over a period, as more and more air is pulled into the engine 102, a degree of contaminants 164 trapped at the first surface 154 may increase. This increase in contaminants 164 may eventually breach the first clogging threshold value, thereby indicating the requirement to purge the air filter 110.

In response to the breach in the first clogging threshold value, the auxiliary controller 190 may pass a voltage signal (which is above the first threshold value) to the control valve 114 to open the control valve 114, thus causing air from the air reservoir 112 to pass towards the second surface 156 of the filter element 132. This air moves through the filter element 132, from the second surface 156 to the first surface 154, and in transit through the filter element 132, dislodges the contaminants 164 trapped at the first surface 154 of the filter element 132 and moves the contaminants 164 to the first chamber portion 146.

The controller 118 may detect the voltage signal, passed by the auxiliary controller 190, to be above the first threshold value, and accordingly, may determine the initiation of the purging of the air filter 110. Based on said determination, and according to a method for operating the air intake system 104, the controller 118 may activate the blower 116 that may generate suction and draw air from the first chamber portion 146 of the air filter 110. This in turn facilitates the purged contaminants 164 (dislodged from the first surface 154) to flow along with the air drawn from the first chamber portion 146 to the blower 116, and then be released into the ambient 166 through the exit fluid line 182.

As gradually the contaminants 164 from the first surface 154 are purged and dislodged, the clogging of the air filter 110 may fall below a second clogging threshold value and a pressure differential between the first chamber portion 146 and the second chamber portion 148 may reduce. The pressure differential may gradually fall below the second differential threshold. At this point, the controller 118 may determine that a clogging of the air filter 110 may too have fallen below the second clogging threshold value, and that a further purging of the air filter 110 may be unrequired and/or may be stopped. Accordingly, the auxiliary controller 190 may halt a transmission of a voltage signal or transmits a voltage signal that is below the second threshold value to the control valve 114 to close the control valve 114.

The controller 118 may detect this voltage signal (i.e. below the second threshold value) for the predefined time duration, t1, and accordingly, may determine the completion of the purging of the air filter 110. In an embodiment, and according to the method for operating the air intake system 104, the controller 118 may deactivate the blower 116 either at the completion of the purging of the air filter 110, or after the predetermined time, t2, has lapsed since the determination of said completion.

In an embodiment, when the auxiliary controller 190 is omitted, the controller 118 may be directly linked with the first sensor 176 and the second sensor 178, and may directly seek input from the first sensor 176 and the second sensor 178 of respective pressure conditions within the first chamber portion 146 and the second chamber portion 148. Such input may help the controller 118 determine a pressure differential across the air filter 110 (i.e. across the filter element 132). Accordingly, as soon as the controller 118 may detect an increase of the pressure differential above the first differential threshold, the controller 118 may transmit a voltage signal that is above the first threshold value to the control valve 114 for opening the control valve 114. Simultaneously, or sequentially, the controller 118 may also activate the blower 116 so that the blower 116 may generate suction and draw purged contaminants 164 from the first chamber portion 146 of the air filter 110. Further, as soon as the controller 118 may detect a decrease of the pressure differential below the second differential threshold, the controller 118 may halt voltage transmission or reduce the voltage signal transmission to a value below the second threshold value to close the control valve 114. The controller 118 may determine the completion of the purging of the air filter 110 when the voltage signal receivable by the control valve 114 falls below a second threshold value for the predefined time duration, t1, and may deactivate the blower 116. As with the discussions above, the controller 118 may alternatively deactivate the blower 116 only after the predetermined time, t2, has lapsed since the determination of the completion of the purging of the air filter 110.

The deactivation of the blower 116 refrains the blower 116 from a continuous working mode and thus saves the engine system 100 from unnecessary energy drain. Moreover, such deactivation of the blower 116 keeps the blower 116 out of use for periods when no purging is required or being performed, thus increasing a useful life of the blower 116. Additionally, blower deactivation also facilitates an overall decrease in an effective inlet pressure restriction to the engine 102, as a continuous blower operation may otherwise take away a portion of the pressure supplied at the first chamber portion 146, thus improving engine performance and reducing parasitic losses.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A method for operating an air intake system for an engine, the air intake system including an air filter configured to provide filtered air to the engine for combustion, the method comprising:
   activating a blower, using a controller, to generate suction and draw purged contaminants from the air filter during a purging cycle to purge contaminants from the air filter;
   deactivating the blower, using the controller, upon a determination of a completion of the purging cycle to purge contaminants from the air filter; and
   determining a clogging of the air filter, wherein the completion of the purging cycle to purge contaminants from the air filter is determined when the determined clogging of the air filter is below a second clogging threshold value.

2. The method of claim 1 further including determining an initiation of the purging cycle to purge contaminants from the air filter,
   wherein the blower is activated when the initiation of the purging cycle to purge contaminants from the air filter is determined.

3. The method of claim 2, wherein the air intake system includes
   an air reservoir configured to store air at a pressure and configured to provide air to the air filter to purge contaminants from the air filter, and
   a control valve configured to control flow of air from the air reservoir to the air filter, wherein
      determining the initiation of the purging cycle to purge contaminants from the air filter includes
         detecting, using the controller, a voltage signal receivable by the control valve, and
         determining, using the controller, the initiation of the purging cycle to purge contaminants from the air filter when the voltage signal is detected above a first threshold value.

4. The method of claim 3 further including determining the completion of the purging cycle to purge contaminants from the air filter when the voltage signal receivable by the control valve falls below a second threshold value for a predefined time duration.

5. The method of claim 1, wherein the blower is activated when the determined clogging of the air filter is above a first clogging threshold value.

6. The method of claim 5, wherein said determining the clogging of the air filter includes measuring a pressure differential across the air filter.

7. The method of claim 1, wherein the blower is deactivated after a predetermined time has lapsed since the determination of the completion of the purging cycle to purge contaminants from the air filter.

8. An air intake system for an engine, the air intake system comprising:
- an air filter configured to provide filtered air to the engine for combustion;
- an air reservoir storing air at a pressure and configured to provide air to the air filter for a purging operation to purge contaminants from the air filter;
- a control valve configured to control flow of air from the air reservoir to the air filter;
- a blower fluidly coupled to the air filter; and
- a controller configured to
  - activate the blower to generate suction and draw purged contaminants from the air filter during the purging operation to purge contaminants from the air filter, and
  - deactivate the blower upon determination of a completion of the purging operation to purge contaminants from the air filter,
- wherein the controller is configured to determine a clogging of the air filter, wherein the blower is activated when the clogging of the air filter is above a first clogging threshold value.

9. The air intake system of claim 8, wherein the controller is configured to determine an initiation of the purging operation to purge contaminants from the air filter, wherein the controller activates the blower when the initiation of the purging operation to purge contaminants from the air filter is determined.

10. The air intake system of claim 9, wherein the controller is configured to determine the initiation of the purging operation to purge contaminants from the air filter by
- detecting a voltage signal receivable by the control valve, and
- determining the initiation of the purging operation to purge contaminants from the air filter when the voltage signal is detected above a first threshold value.

11. The air intake system of claim 10, wherein the controller is configured to determine the completion of the purging operation to purge contaminants from the air filter when the voltage signal receivable by the control valve falls below a second threshold value for a predefined time duration.

12. The air intake system of claim 8, wherein said determining the clogging of the air filter includes measuring a pressure differential across the air filter.

13. The air intake system of claim 8, wherein the controller is configured to determine a clogging of the air filter, wherein the completion of the purging operation to purge contaminants from the air filter is determined when the determined clogging of the air filter is below a second clogging threshold value.

14. The air intake system of claim 8, wherein the blower is deactivated after a predetermined time has lapsed since the determination of the completion of the purging operation to purge contaminants from the air filter.

15. An engine system, comprising:
- an engine; and
- an air intake system fluidly coupled to the engine to supply air to the engine for combustion, the air intake system including:
  - an air filter to filter air supplied to the engine;
  - an air reservoir storing air at a pressure and configured to provide air to the air filter for a purging operation to purge contaminants from the air filter of contaminants;
  - a control valve configured to control flow of air from the air reservoir to the air filter;
  - a blower fluidly coupled to the air filter and configured to generate suction and draw purged contaminants from the air filter during a purging operation to purge contaminants from the air filter; and
  - a controller configured to
    - determine an initiation of the purging operation to purge contaminants from the air filter,
    - activate the blower when the initiation of the purging operation to purge contaminants from the air filter is determined, and
    - deactivate the blower upon determination of a completion of the purging operation to purge contaminants from the air filter,
  - wherein the controller is configured to determine the initiation of the purging operation to purge contaminants from the air filter by
  - detecting a voltage signal receivable by the control valve, and
  - determining the initiation of the purging of the air filter when the voltage signal is detected above a first threshold value.

16. The engine system of claim 15, wherein the controller is configured to determine the completion of the purging operation to purge contaminants from the air filter when the voltage signal receivable by the control valve falls below a second threshold value for a predefined time duration.

17. The engine system of claim 15, wherein the blower is deactivated after a predetermined time has lapsed since the determination of the completion of the purging operation to purge contaminants from the air filter.

* * * * *